April 16, 1940. F. C. REILLY ET AL 2,197,509
PROCESS OF AND MACHINE FOR SEPARATING SOLIDS FROM SUSPENSION IN A LIQUID
Filed July 14, 1936   3 Sheets-Sheet 2

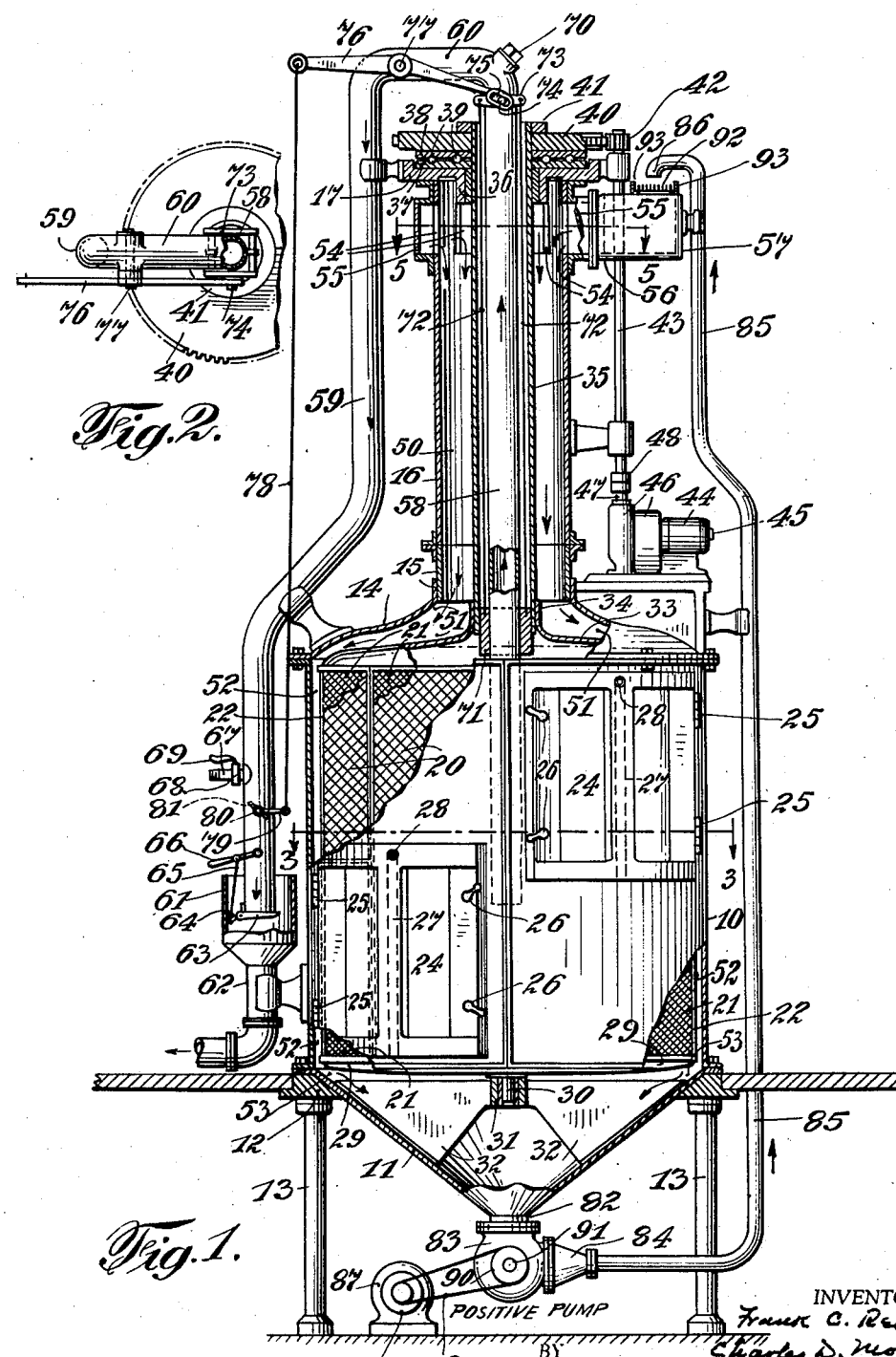

INVENTORS
Charles D. Martin
Francis C. Reilly
BY
ATTORNEY.

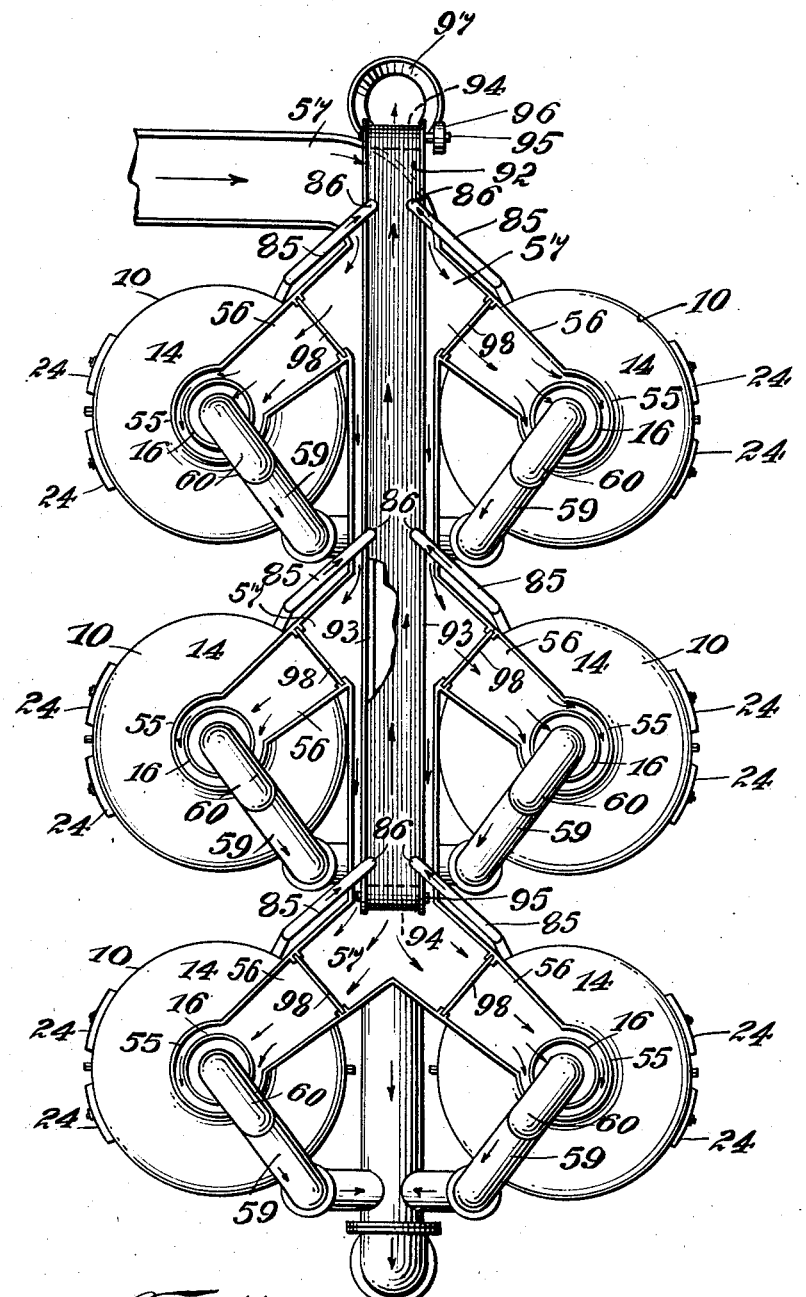

Patented Apr. 16, 1940

2,197,509

UNITED STATES PATENT OFFICE 2,197,509

PROCESS OF AND MACHINE FOR SEPARATING SOLIDS FROM SUSPENSION IN A LIQUID

Frank C. Reilly and Charles D. Morton, New York, N. Y.

Application July 14, 1936, Serial No. 90,486

10 Claims. (Cl. 210—199)

Our invention relates to a process of separating solids from suspension in a liquid and to a machine for carrying out such process, and refers particularly to such processes and machines which are utilized in the separation of solids from sewage, in sewage disposal plants.

One of the objects of our invention is to provide a complete unitary process and machine by which final disposal can be made both of the water from which the solids have been removed and the removed solids, so that thus the water from the sewage treated can be discharged directly into open waters without further treatment, while fully complying with sanitation requirements, and the thoroughly dewatered solids can be delivered directly to an incinerator.

Another object of our invention is a high degree of efficiency, while expeditiously treating large quantities of the solids-containing liquid, by means of a compact space-conserving and time-saving machine.

Another object of our invention is to carry on the operation of the process continuously over indefinitely long periods without intermissions and without stoppage for cleaning the machine, or for any reason.

Another object of our invention is a wide range of control and regulation of the process, depending upon the particular nature of the liquid to be treated.

Another object of our invention is to utilize gravitational force to the best advantage for creating pressure and movement in the liquid being treated.

Other objects of our invention are economy of manufacturing the device and convenience in its use.

Yet other objects of our invention will be evident later.

Having now made a general statement of the objects and nature of our invention, a full understanding thereof can be obtained from the following particular description, with reference to the accompanying drawings, illustrating a practical form of the device of our invention, similar parts being designated by similar numerals.

Figure 1 is a central vertical section through one form of a unitary separating machine or apparatus of our invention.

Figure 2 is a partial plan view of the top in Figure 1.

Figure 7 is a diagrammatic plan view of a battery of separator units similar to that illustrated in the preceding figures, but with some of the parts having a shifted position, in order to facilitate the formation of a compact battery.

Figures 5, 6:
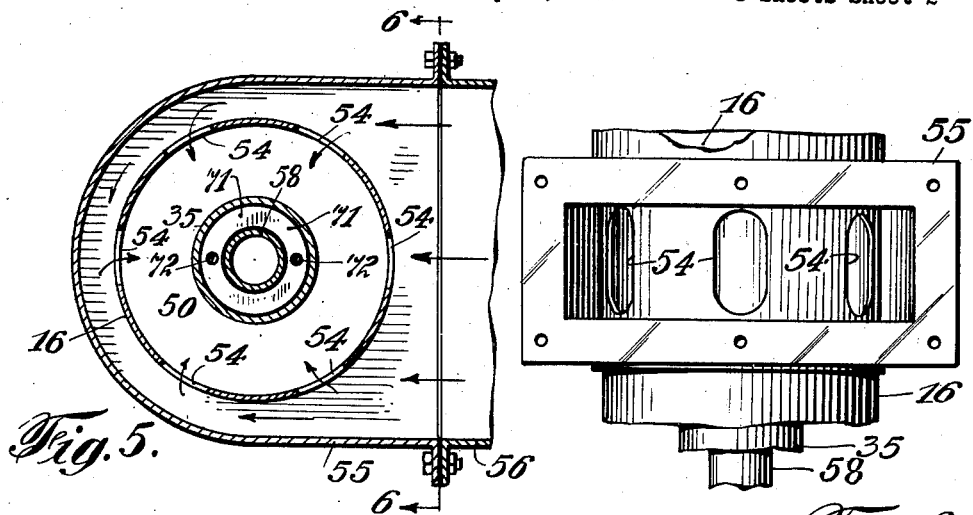
Figure 5 is an enlarged horizontal section on the line 5—5 of Figure 1.
Figure 6 is a broken vertical section on the line 6—6 of Figure 5.
Figure 4:
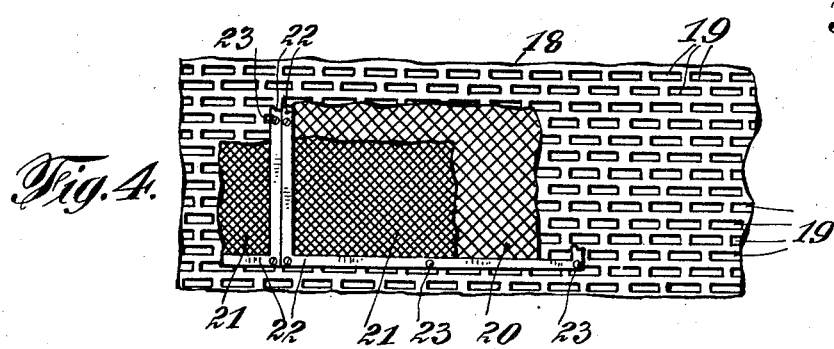
Figure 4 is a broken elevation in development of the outer side of an inner revoluble screen-carrying cylinder, enlarged as in Figure 3.

The particular illustrated form of our invention is a sewage separator. It comprises a unitary coorganization of cooperative parts, elements, and features, as follows:

A stationary upright cylindrical outer casing shell 10 has a depending conical hopper bottom 11 secured thereto, and a strong underlying base ring 12 is secured to the hopper bottom and may be welded thereto. The casing shell 10 may be conveniently formed in two semi-cylindrical halves fixedly secured together, as indicated.

In the particular machine shown in the drawings, the diameter and length of the casing shell 10 are each about nine feet, while the height of the complete machine unit is indicated as being approximately three times the length of the casing shell 10.

Each such machine is designed to dispose of one million gallons of sewage per day of twenty-four hours. Machines of this size and capacity are well adapted for use in many sewage disposal plants. A single machine unit may be employed, substantially as indicated in Figure 1, or any convenient number of such units may form an assemblage in a battery, as indicated in Figure 7.

Any suitable supporting means for the machine may be provided beneath the base ring 12, such as a suitable number of posts or standards 13—13.

The casing shell 10 has an upwardly dished top cover head 14, provided with a short central tubular neck 15, to which there is fixedly attached an upwardly extended standpipe 16. The upper end of this standpipe has a cap member 17 fixed thereon.

An upright revoluble screen-carrying cylinder 18 is concentrically disposed within and spaced from the casing shell 10. This cylinder is provided throughout its extent or area with a continuous field of circumferentially elongated apertures or slotted perforations 19—19.

Coarse screens 20—20 overlie the radially outer surface of the cylinder 18, in contact therewith, and form foraminate bridges across its perforations 19—19. Fine screens 21—21, of about 80 to 100 meshes per square inch, outwardly overlie and are in contact with the bridging screens 20—20, which form backing supports therefor.

The superposed screens 20—20 and 21—21 are carried by rectangular screen frames 22—22, which are horizontally arcuate. The screens 20—20 and 21—21 have their margins overlapped upon the inner faces of the bars of the frames 22—22 and are affixed thereto, by soldering, welding, or otherwise.

Figure 3:
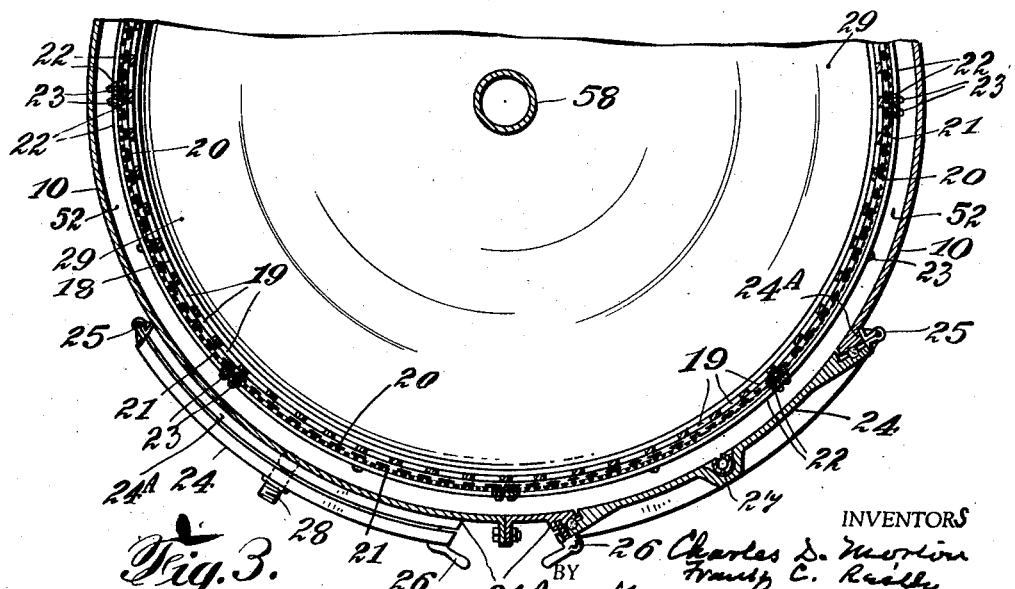
Figure 3 is an enlarged broken horizontal section on the line 3—3 of Figure 1.

The screen frames 22—22 completely cover the cylinder 18, with edges of their frame bars abutting each other. A total number of sixteen such screen frames, arranged in an upper and a lower tier, are indicated in Figures 1 and 3. These screen frames are removably fixed upon the cylinder 18 by any convenient means, shown as screws 23—23. In the illustrated machine the fine outer screens 21—21 are spaced about two inches from the inner surface of the casing shell 10.

The outer casing shell 10 is provided with similar upper and lower outwardly opening gasket-sealed doors 24—24, through which the screen frames 22—22 may be removed, for cleaning or repairing the screens. A door frame 24A underlies the margin of each of the doors 24—24, on the casing shell 10.

Hinges 25—25 are provided at one edge of each door 24 and releasable screw clamps 26—26 at its other edge. Any desired number of the hinges and clamps may be employed. Clamps, such as 26—26, may be used in place of the hinges 25—25, if desired. In such case, the doors 24—24 will need to be removed and taken down, when they are opened.

Each door 24 carries a vertical inwardly perforated spray pipe 27, set flush into its inner face. The lower end of this pipe is closed adjacent the lower end of the door, while its upper end carries a nipple 28 extended out through the upper margin of the door and providing for the attachment of a hose. This provides for cleaning the screens by means of hot water, or other cleaning fluid, without opening the doors. Closure caps, not shown, are provided for the nipples 28—28.

The lower end of the screen-carrying cylinder 18 is fixed to a slightly dished bottom closure 29, which at its center fixedly carries a downwardly extended stud 30, which is journaled in a bushed bearing 31. The bearing 31 is formed upon, or otherwise supported by, a suitable number of triangular wings 32—32 fixed within the upper portion of the hopper bottom 11.

The upper end of the cylinder 18 is fixed to an upwardly dished cover head 33, having a central tubular neck 34 formed thereon which is telescoped over and fixed upon the lower end of an upwardly extended tubular or hollow shaft 35 which passes centrally through the standpipe 16 in rather widely spaced relation therewith. This tubular shaft 35 is journaled in a bushed bearing 36 formed upon the cap member 17, above which the open upper end of this shaft extends.

The weight of the revoluble screen-carrying cylinder 18 and its described adjuncts is supported upon the cap member 17 from the rotative tubular shaft 35 by means of an interposed anti-friction thrust bearing. This bearing has a stationary lower track disc 37 supported upon the top of the cap 17. An upper rotative track disc 38 is fixed upon the shaft 35. Interposed bearing balls 39 run in track grooves formed in the discs 37 and 38.

A spur gear 40 fixed upon the shaft 35, for rotating the latter, forms a backing for the upper face of the upper bearing disc 38. A thrust collar 41 fixed upon the upper end of the hollow shaft 35 abuts upon the top of the gear 40.

The gear 40 is meshed by a pinion 42 fixed upon the upper end of a vertical transmission shaft 43. An electric motor 44 has its rotor shaft 45 connected, through the contained gears (not shown) of a variable speed gear box 46, to the upstanding shaft 47 of the latter, which is coupled at 48 to the lower end of the upwardly extended transmission shaft 43. The construction of such gear boxes is well known.

Thus the rate of speed of circumferential linear travel of the revoluble cylinder 18, together with that of the screens 20—20 and 21—21, may be changed or varied as desired, depending upon various particular operating conditions, such as the nature of the liquid being treated. Under ordinary or substantially usual conditions, the speed of movement of the fine outermost screens 21—21 should be at the rate of about 400 feet per minute.

An annular space or passageway 50, for the downward flow of liquid to be treated, is formed around the hollow shaft 35 within the standpipe 16 and casing head neck 15. This annular space 50 opens downwardly from the neck 16 into a radially expanding flow space 51 formed between the casing head 14 and the rotative cylinder head 33.

The outer head 14 being more deeply dished than the inner head 33, the intervening space 51 becomes gradually thinner or narrower toward the upper end of a cylindrical annular passageway or flow space 52 into which the space 51 opens circumferentially and which is formed within the casing shell 10 around the fine outer screens 21—21 of the revoluble cylinder 18.

The lower end of the cylindrical annular space 52 opens downwardly through a short annular flow space 53 formed circumferentially between the rotative cylinder bottom 29 and the upper edge portion of the casing hopper bottom 11.

Below the cap member 17 and just beneath the level of the lower end of its bearing 36, the standpipe 16 has a complete circular series of rather large vertically elongated inlet parts 54—54, shown as being six in number, and as leaving adequate strength in the standpipe.

This parted portion of the standpipe 16 is enclosed within and surrounded by an inlet box or entrance chamber 55, which encircles and is mounted upon the standpipe 16. This chamber has top and bottom closure walls, side walls adequately spaced from the standpipe 16, being shown as desirably curved around it, and is open at one of its sides, where it is shown as flanged.

A feed branch 56, leading from a trough-shaped supply flume 57, for liquid to be treated, is connected with the open flanged side of the entrance chamber 55, as shown in Figures 1, 5, and 7.

During the operation of the machine, to be particularly described later, a stream of untreated liquid, such as raw sewage, carrying solids in suspension, is allowed to flow continuously by gravity from the flume trough 57 and downwardly through the standpipe 16 into the described outer casing.

The treated liquid, or liquid from which solids have been removed, is referred to as desolidized liquid.

A body of such desolidized liquid is contained within and completely fills the revolving cylinder 18, from which a stream of this liquid is caused to pass out continuously.

A stationary suction pipe 58 enters the upper end of the tubular shaft 35 and extends downwardly into the cylinder 18 along its axis and terminates with an open inlet end at a level shown as somewhat below the middle of the length of this cylinder.

The suction pipe 58 forms the inner branch or leg of a siphon, having an outer branch or leg 59, and an intermediate connecting portion 60 above the upper end of the hollow shaft 35. The outer siphon leg 59 extends downwardly at the outside of the standpipe 16 and casing shell 10 and terminates well below the upper level of the body of liquid within the cylinder 18.

The lower end of the outer siphon leg 59 extends into an upwardly open bell 61 carried upon the upper end of an out-fall pipe 62, for effluent liquid.

A swinging flap valve 63, for manually closing the end of the outer pipe 59 of the siphon, is pivoted thereon and has an arm 64 connected by a link 65 with a handle lever 66 above the bell 61 and pivotally fulcrumed upon the siphon pipe 59.

A nipple 67 upon the siphon pipe 59 communicates therewith and is provided with a stopcock valve 68 having a handle 69. This provides for attaching a flexible pipe, or hose, for vacuizing the siphon, for initiating the flow of effluent liquid through it.

The top of the inner pipe leg 58 is provided with a closure plug 70 for an opening through which, by means of a hose, the entire interior of the machine is to be filled with water before starting the machine in operation.

The level of the body of liquid within the cylinder 18 must not be permitted to fall below the upper edges of the screens 20—20 and 21—21. In Figure 1 this level is indicated, by a broken line, as being safely above the upper end of the cylinder 18, within its dished cover head 33. Means are provided for automatically maintaining the desired level of this contained body of liquid.

An annular float 71 loosely surrounds the inner siphon leg pipe 58 and is loosely contained within the lower end of the tubular shaft 35. The float 71 is connected by rods 72—72 with a collar frame 73 which is slidably guided upon the siphon pipe 58 above the upper end of the hollow shaft 35.

This frame 73 carries a stud 74 which engages in a slot 75 formed longitudinally in an arm of a lever 76 of the first class which is fulcrumed upon a pivot stud 77 carried by the interconnecting pipe 60 of the siphon. The outer arm of this lever is pivotally connected by a link rod 78 to an actuating arm 79 carried by the pivot shaft 80 of a butterfly valve 81 within the lower end portion of the outer siphon leg pipe 59, and shown as between the flap valve handle lever 66 and the vacuizing nipple 67.

This butterfly valve 81 is an automatically operated regulating valve in control of the upper level of the body of liquid contained within the revolving cylinder 18. In Figure 1, the valve 81 is shown as at an intermediate position of control. It is evident that upward movement of the float 71 will rock the valve 81 toward its fully open position, thereby increasing the flow of effluent liquid through the siphon, and that downward movement of the float will rock this valve toward a more nearly closed position, thereby decreasing the outflow.

The hopper bottom 11 of the casing shell 10 forms a settling chamber for partially deliquized sludge. This conical casing bottom 11 is centrally provided with a sludge outlet 82, which is sealed by means of a positive delivery sludge pump 83 connected thereto. Such pumps being well known, the internal construction of the pump 72 does not require illustration.

The wings 32—32, which leave the lower central portion of the hopper bottom 11 clear and unobstructed, form baffle plates which prevent swirling or rotational movement of the sludge-containing liquid. It would have a tendency to such movement from the revolving screen-carrying cylinder 18 and its rotating bottom 29. These baffles 32—32 greatly facilitate the settling of the sludge in the chamber 11.

The sludge pump 83 has a delivery connection 84 connected to the lower end of a sludge-elevating pipe 85. This pipe 85 extends upwardly and terminates in a downwardly turned outlet end 86, over the supply flume 57.

The sludge pump 83 is driven by means of an electric motor 87, having a rotor pulley 88 connected by a belt 89 with a pulley 90 on a rotor shaft 91 of the pump. Thus the sludge pump 83 is capable of being independently operated periodically, and is ordinarily thus operated at intervals of half an hour, more or less, the sludge being left to settle in the chamber 11 between times.

The pressure upon the sludge in the chamber 11 by the weight of the liquid above it is transmitted through the pump 83 to the sludge in the pipe 85, so that thus the work of the pump 83 in elevating the sludge is lightened, the weight of the sludge in the pipe 85 being substantially counterbalanced by the weight of the liquid in the casing standpipe 16, shell 10, and hopper bottom chamber 11.

An endless traveling sludge-draining belt 92 extends longitudinally over the open-top supply flume 57 beneath the outlet end 86 of the sludge-elevating pipe 85, and may similarly extend beneath the outlet ends 86—86 of a plurality of similar sludge-elevating pipes 85—85 belonging to the respective units of a separator battery assemblage, as shown in Figure 7.

The marginal edges of the sludge-carrying upper stretch or run of this drainage belt 92 are supported upon and travel along the lower inturned horizontal flanges of a pair of angle bars 93—93, which may be conveniently supported upon the flume 57.

This draining belt 92 is shown in Figure 7 as running over rollers 94—94 having axles 95—95 journaled in the bars 93—93. This belt may be driven in any convenient way, as is indicated by a pulley 96 upon a roller axle 95, in Figure 7.

The belt 92 may be formed of any suitable screening. There are several well known forms of such belts. One well known form of such a belt consists of short sections of wire screen hinged together.

The liquid-containing sludge from the pipe 85, or from several such pipes, as in Figure 7, is delivered upon the traveling drainage belt 92 and transported away, the water, or other liquid, draining through the belt into the flume 57, whence it returns by gravity through the flume branch 56 into the standpipe 16.

The drained sludge remnant of solids is dumped by the belt 92 into a funnel 97, whence, having been deprived of nearly all of the liquid, it may go directly to an incinerator, without further treatment.

In Figure 7, the flume branches 56—56 are shown as provided with gates 98—98, by means of which the quantity of affluent or inflowing liquid for each of the machine units may be controlled.

The shifted positions of parts, such as the supply flume branch 56, siphon pipe 59, and sludge pipe 85, in the diagrammatic view of Figure 7, do not involve any substantial changes in construction from that described with reference to Figures 1 to 6 inclusive, and the same reference numerals have been applied to corresponding parts.

The operation of the above-described device of our invention is as follows:

Preparatory to putting a machine unit in operation, it is filled with water, including the cylinder 18, casing shell 10, bottom hopper chamber 11, and standpipe 16. The driving motor 44 is then started, and the liquid from which solids are to be removed, in this particular instance, raw sewage, is released for its flow into the standpipe 16 from the supply flume 57. The siphon flap valve 63 is now to be closed and the nipple turncock valve 68 opened to a vacuizing connection, which starts the operation of the siphon.

The downwardly flowing liquid within the standpipe 16 may have therein any desired upper level, depending upon how much pressure it is desired to have within the casing shell 10, this gravity pressure being utilized for effecting the passage of liquid inwardly through the revolving screens 21—21, 20—20, and apertured cylinder 18, into the body of liquid contained within the revolving cylinder 18. It is to be noted that this pressure from gravity is augmented by the momentum of the moving liquid, as the solids-containing liquid moves toward and into the bottom chamber 11.

The rate at which the liquid thus passes through the screens and cylinder also depends upon the linear speed of the revolving movement of the cylinder 18 and its screens 20—20 and 21—21. The more rapidly the cylinder and its screens move, the more slowly will the liquid pass through them, at a given pressure, and the pressure would have to be increased for a given output of the effluent liquid. On the other hand, should the cylinder and screen movement be too slow, for a given pressure, then the screens would become clogged with sludge, particularly in their lower portions.

It is evident that the horizontal or circumferential elongation of the apertures 19—19 of the cylinder 18 aids or facilitates the passage of liquid through this cylinder, with less frictional resistance, as the cylinder revolves, as will be readily understood.

By reason of the vertical position of the casing shell 10, gravitational force can be utilized advantageously therein throughout the length of the vertical annular passageway flow space 52. It is to be noted that this space 52 is filled with a continuously moving unbroken annular stream of liquid flowing downwardly therein in annular form.

This downwardly moving annulus of liquid is continuously renewed by a circumferential replenishing stream of liquid entering its upper end from all around the annular circumference of the radially expanded flow space 51.

A circumferential stream of partially deliquidized sludge is continuously passed downwardly from all around the lower end of the annulus of liquid, through the circumferential annular flow space 53, and into the hopper bottom 11, where it settles and collects as a heavy concentrated sludge, still containing some liquid.

The natural tendency of the heavier solids to settle is of advantage in the annular vertical passageway 52. However, it is to be particularly noted that the oily and greasy solids, having a normal tendency to float, are equally distributed all around within the space 52. They are there intermixed with the heavier solids and are carried downwardly by the moving stream. They are thus unable to collect at the top and lower the percentage of removal, or clog the screens, but are trapped in the sludge.

The radial dimensions or thickness of the cylindrical annular passageway space 52 is not particularly critical. Should it be unnecessarily wide, the output capacity of the machine will be decreased relatively to the diameter of the casing shell 10, because of the relatively reduced area of the cylinder 18 and its screens 20—20 and 21—21. This involves an item of expense to be seriously considered in a large machine, which should be as compact as possible.

On the other hand, should this space 52 be too thin or narrow radially, the movement of the flowing stream will be unduly retarded by friction, thus also decreasing the working capacity, as well as also having a tendency to cause the thickening sludge toward the bottom to clog the lower portions of the screens, because it would have insufficient space within which to move downwardly.

The rate of speed of the downward movement of the liquid becomes slower toward the lower end of the space 52, while the pressure upon this liquid becomes greater. These factors are of advantage for extracting a maximum amount of liquid from the thickening sludge-containing liquid. A relatively narrow space 52 is also of advantage, as to efficiency.

Just what takes place in the separating action, in which liquid from the inner side of the annulus thereof within the space 52 passes or flows inwardly, under pressure, through the screens 21—21, 20—20, and apertured cylinder 18, while leaving behind 90 per cent, or more, of the suspended solids, with the screens remaining clean, free of solids, and unclogged thereby, for a substantially indefinite period, cannot be positively determined, since there is no way by which such separating action can be observed.

It seems to be evident that what probably takes place is about as follows:

When particles of solids are struck by the outer face of a fine outermost screen 21, these particles are deflected or pushed aside, being thrown outwardly away from the screen, by the movement of the screen. This action upon the particles themselves is in part centrifugal. Being thus repeatedly knocked away from the screen, these particles cannot pass through it with the inwardly moving liquid which passes through the screen.

Another factor is that the solids-containing liquid in the immediate vicinity of the screens 21—21 acquires some movement of revolution from friction with the moving screens, and the centrifugal force thus developed has a greater effect upon the heavier solids than it does upon the inwardly flowing liquid in which these solids are contained. This centrifugal force in the thin shell of more slowly revolving liquid which immediately surrounds the more rapidly revolving screens has a tendency to prevent particles of solids from being brought into contact with the screens.

Another important factor is that the movement of the screens 21—21 through the liquid cause the latter to brush away particles of solids should they come into contact with the screens, so that thus such particles are unable to attach themselves to or find lodgement upon the screens, which would then accumulate until they clogged the screens.

The downward flow of the liquid within the shell space 52 assists in this sweeping action upon the outer faces of the screens 21—21. It thus seems evident that the downward movement of liquid within the space 52 has more or less of a spiral form, particularly in close proximity to the screens 21—21.

Irrespective of the precise principles of factors involved in the separating action, such action has proved to be highly efficient. In sewage separation, the effluent water can be safely discharged into tidal, or other, waters, without further treatment. Also the drained remnant of the separated sludge requires no separate dewatering, or other, treatment, for its final disposal in an incinerator, or otherwise.

Thus, our invention comprehends a complete self-contained or unitary solids-removal system, which functions to produce all of the desired results at the same time, in one place, by one operation. The upright or vertical arrangement or positioning of the major parts, with their particular cooperative relation, contributes largely to high efficiency of separation, besides economizing space.

It is obvious that various modifications may be made in the process and in the construction of the machine of our invention shown in the drawings and above particularly described, within the principle and scope of our invention as defined in the appended claims.

We do not strictly limit ourselves to specific details of procedure in the process nor of construction in the machine, nor to size or shape or materials, nor to specific proportions or relationship of parts, these being given simply as a means for clearly describing and explaining the process and machine of our invention.

What we claim is:

1. In a separator, in combination, a stationary cylindrical casing shell, a cylindrical screen element revoluble within said shell and forming an annular cylindrical flow space therewith, end closures on said element, a closure head on one end of said shell forming an inflow space with one of said end closures, an inflow standpipe for liquid to be treated extended above said shell and opening downwardly into said closure head, a sludge-receiving chamber forming a closure for the other end of said shell and having its bottom extended below said shell, and a pipe extended from within said screen element to the outside of said casing shell and through which treated liquid is withdrawn from within said revolving screen element.

2. In a separator, in combination, a stationary upright cylindrical casing shell, an axially upright revolving screen element within said shell and forming a vertical annular cylindrical flow space therewith, a bottom closure disc and a top closure head on said element, a top cover head on said shell forming a radial inflow space with said closure head, an inflow standpipe for liquid to be treated opening downwardly into the center of said cover head, a tubular rotatable shaft fixed centrally to and opening downwardly into said closure head and extended upwardly through said standpipe in annularly spaced relation therewith with an open upper end above said standpipe, a stationary suction pipe extended through said shaft into said revolving screen element for withdrawing liquid which has been treated by passing inwardly through said revolving screen element from said annular cylindrical space, and a downwardly extended sludge hopper forming a bottom closure for the lower end of said shell.

3. In a separator, in combination, a stationary upright cylindrical casing shell, an axially upright revolving screen element within said shell and forming a vertical annular cylindrical flow space therewith, a bottom closure disc and a top closure head on said element, a top cover head on said shell forming a radial inflow space with said closure head, an inflow standpipe for liquid to be treated opening downwardly into the center of said cover head, a tubular rotatable shaft fixed centrally to and opening downwardly into said closure head and extended upwardly through said standpipe in annularly spaced relation therewith with an open upper end above said standpipe, a stationary suction pipe extended through said shaft into said revolving screen element for withdrawing liquid which has been treated by passing inwardly through said revolving screen element from said annular cylindrical space, a downwardly extended sludge hopper forming a bottom closure for the lower end of said shell, a positive-delivery sludge pump connected to the bottom of said hopper, and an upwardly extended sludge-elevating pipe connected to the delivery outlet of said pump.

4. In a separator, in combination, a stationary upright cylindrical casing shell, an axially upright revolving screen element within said shell and forming a vertical annular cylindrical flow space therewith, a bottom closure disc and a top closure head on said element, a top cover head on said shell forming a radial inflow space with said closure head, an inflow standpipe for liquid to be treated opening downwardly into the center of said cover head, a tubular rotatable shaft fixed centrally to and opening downwardly into said closure head and extended upwardly through said standpipe in annularly spaced relation therewith with an open upper end above said standpipe, a stationary suction pipe extended through said shaft into said revolving screen element for withdrawing liquid which has been treated by passing inwardly through said revolving screen element from said annular cylindrical space, said suction pipe forming the inner leg of a siphon having an outer leg for effluent liquid extended downwardly at the outside of said casing shell and greater effective length than its inner leg, and a downwardly extended sludge hopper forming a bottom closure for the lower end of said shell.

5. In a separator, in combination, a stationary upright cylindrical casing shell, an axially upright revolving screen element within said shell and forming a vertical annular cylindrical flow space therewith, a bottom closure disc and a top closure head on said element, a top cover head on said shell forming a radial inflow space with said closure head, an inflow standpipe for liquid to be treated opening downwardly into the center of said cover head, a tubular rotatable shaft fixed centrally to and opening downwardly into said closure head and extended upwardly through said standpipe in annularly spaced relation therewith with an open upper end above said standpipe, a stationary suction pipe extended through said shaft into said revolving screen element for withdrawing liquid which has been treated by passing inwardly through said revolving screen element from said annular cylindrical space, said suction pipe forming the inner leg of a siphon having an outer leg for effluent liquid extended downwardly at the outside of said casing shell and greater effective length than its inner leg, a downwardly extended sludge hopper forming a bottom closure for the lower end of said shell, a flow-controlling regulating valve in the lower portion of the outer leg of said siphon, and automatically acting operating means for said valve comprising a float within said closure head and connected with said valve.

6. In a separator, in combination, a stationary upright cylindrical casing shell, an axially upright revolving screen element within said shell and forming a vertical annular cylindrical flow space therewith, a bottom closure disc and a top closure head on said element, a top cover head on said shell forming a radial inflow space with said closure head, an inflow standpipe for liquid to be treated opening downwardly into the center of said cover head, a tubular rotatable shaft fixed centrally to and opening downwardly into said closure head and extended upwardly through said standpipe in annularly spaced relation therewith with an open upper end above said standpipe, a stationary suction pipe extended through said shaft into said revolving screen element for withdrawing liquid which has been treated by passing inwardly through said revolving screen element from said annular cylindrical space, a downwardly extended sludge hopper forming a bottom closure for the lower end of said shell, a positive-delivery sludge pump connected to the bottom of said hopper, an upwardly extended sludge-elevating pipe connected to the delivery outlet of said pump, a feed passage leading into the upper end portion of said standpipe, an open-top supply flume from which said feed passage leads, and an endless traveling sludge-draining belt running longitudinally over said flume and beneath an upper outlet end of said sludge-elevating pipe.

7. In a separator, in combination, a stationary upright cylindrical casing shell, an axially upright revolving screen element within said shell and forming a vertical annular cylindrical flow space therewith, a bottom closure disc and a top closure head on said element, a top cover head on said shell forming a radial inflow space with said closure head, an inflow standpipe for liquid to be treated opening downwardly into the center of said cover head, a tubular rotatable shaft fixed centrally to and opening downwardly into said closure head and extended upwardly through said standpipe in annularly spaced relation therewith with an open upper end above said standpipe, a stationary suction pipe extended through said shaft into said revolving screen element for withdrawing liquid which has been treated by passing inwardly through said revolving screen element from said annular cylindrical space, a downwardly extended sludge hopper forming a bottom closure for the lower end of said shell, a plurality of removable screen-carrying screen frames belonging to said screen element, and an outwardly-opening door for said shell through which said screen frames can be removed.

8. In a separator, in combination, a stationary upright cylindrical casing shell, an axially upright revolving screen element within said shell and forming a vertical annular cylindrical flow space therewith, a bottom closure disc and a top closure head on said element, a top cover head on said shell forming a radial inflow space with said closure head, an inflow standpipe for liquid to be treated opening downwardly into the center of said cover head, a tubular rotatable shaft fixed centrally to and opening downwardly into said closure head and extended upwardly through said standpipe in annularly spaced relation therewith with an open upper end above said standpipe, a stationary suction pipe extended through said shaft into said revolving screen element for withdrawing liquid which has been treated by passing inwardly through said revolving screen element from said annular cylindrical space, a downwardly extended sludge hopper forming a bottom closure for the lower end of said shell, said screen element having an annular cylinder provided with a field of circumferentially elongated apertures.

9. In a separator, in combination, a stationary upright cylindrical casing shell, an axially upright revolving screen element within said shell and forming a vertical annular cylindrical flow space therewith, a bottom closure disc and a top closure head on said element, a top cover head on said shell forming a radial inflow space with said closure head, an inflow standpipe for liquid to be treated opening downwardly into the center of said cover head, a tubular rotatable shaft fixed centrally to and opening downwardly into said closure head and extended upwardly through said standpipe in annularly spaced relation therewith with an open upper end above said standpipe, a stationary suction pipe extended through said shaft into said revolving screen element for withdrawing liquid which has been treated by passing inwardly through said revolving screen element from said annular cylindrical space, a downwardly extended sludge hopper forming a bottom closure for the lower end of said shell, and a vertically extended perforated spray pipe spaced outwardly from said screen element within said shell and having means by which a connection can be made thereto at the outside of said shell.

10. In a separator, in combination, a stationary upright cylindrical casing shell, an axially upright revolving screen element within said shell and forming a vertical annular cylindrical flow space therewith, a bottom closure disc and a top closure head on said element, a top cover head on said shell forming a radial inflow space with said closure head, an inflow standpipe for liquid to be treated opening downwardly into the center of said cover head, a tubular rotatable shaft fixed centrally to and opening downwardly into said closure head and extended upwardly through said standpipe in annularly spaced relation therewith with an open upper end above said standpipe, a stationary suction pipe extended through said shaft into said revolving screen element for withdrawing liquid which has been treated by passing inwardly through said revolving screen element from said annular cylindrical space, said suction pipe forming the inner leg of a siphon having an outer leg for effluent liquid extended downwardly at the outside of said casing shell and greater effective length than its inner leg, a downwardly extended sludge hopper forming a bottom closure for the lower end of said shell, a manually operable closure valve for the lower end of the outer leg of said siphon, and means providing for applying vacuizing suction to said siphon leg above said valve.

FRANK C. REILLY.
CHARLES D. MORTON.